(12) United States Patent
Pogde et al.

(10) Patent No.: US 7,962,532 B1
(45) Date of Patent: Jun. 14, 2011

(54) MANAGEMENT OF DIRECTORY QUOTAS FOR FILE SYSTEMS

(75) Inventors: Prashant Pogde, Santa Clara, CA (US); Manish M. Agarwal, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 437 days.

(21) Appl. No.: 12/113,170

(22) Filed: Apr. 30, 2008

(51) Int. Cl.
*G06F 12/08* (2006.01)
*G06F 12/12* (2006.01)
*G06F 12/14* (2006.01)

(52) U.S. Cl. ......... 707/825; 707/822; 707/828; 707/829

(58) Field of Classification Search .................. 707/828, 707/829, 831, E17.037, 822, 825
See application file for complete search history.

(56) References Cited

U.S. PATENT DOCUMENTS

| | | | |
|---|---|---|---|
| 2003/0009484 A1* | 1/2003 | Hamanaka et al. | 707/200 |
| 2005/0050107 A1* | 3/2005 | Mane et al. | 707/200 |
| 2006/0117070 A1* | 6/2006 | Thind et al. | 707/200 |
| 2008/0028149 A1* | 1/2008 | Pardikar et al. | 711/118 |
| 2008/0291855 A1* | 11/2008 | Bata et al. | 370/311 |

* cited by examiner

*Primary Examiner* — James Trujillo
*Assistant Examiner* — Soheila Davanlou
(74) *Attorney, Agent, or Firm* — Perkins Coie LLP (57) ABSTRACT

A new approach to support efficient management of directory quotas for a file system is proposed. The approach adopts bitmasks for files and directories in a file system, and transforms the problem of maintaining and traversing complicated file system data structures into a simple bitmask comparison and an associated lookup. It applies to files and directories under CIFS, NFS, other network file systems and local file systems and moves the costly operations of traversing the file system from file operations to administrative operation of switching the quotas on and off, which is infrequent and do not have the performance requirements of regular file operations.

27 Claims, 12 Drawing Sheets

```
┌─────────────────────────────────────┐
│ Link a file or directory to another │
│      directory in a file system     │
│                 602                 │
└─────────────────────────────────────┘
                    │
                    ▼
┌─────────────────────────────────────┐
│  Perform a quota check on all       │
│  directories corresponding to the   │
│  bitmask on the target directory    │
│  to which the file or directory is  │
│             being linked to         │
│                 604                 │
└─────────────────────────────────────┘
                    │
                    ▼
┌─────────────────────────────────────┐
│  Set the bitmask of the file or     │
│  directory being linked to be a     │
│  union of its original bitmask and  │
│  the bitmask of the target          │
│  directory if the check is cleared  │
│                 606                 │
└─────────────────────────────────────┘
                    │
                    ▼
┌─────────────────────────────────────┐
│  Update the directory quotas for    │
│  all relevant directories           │
│  represented by the bitmask of the  │
│           target directory          │
│                 608                 │
└─────────────────────────────────────┘
```

MANAGEMENT OF DIRECTORY QUOTAS FOR FILE SYSTEMS

FIELD OF THE INVENTION

At least one embodiment of the present invention pertains to network storage systems, and more particularly, to a technique for management of directories of storage systems.

BACKGROUND

A storage server is a special purpose processing system used to store and retrieve data on behalf of one or more clients locally or over a network. A storage server operates on behalf of the one or more clients to store and manage shared data in a set of mass storage devices, such as magnetic or optical storage-based disks or tapes. A conventional storage server includes a storage operating system that implements a file system to logically organize data as a hierarchical structure of directories and files on the disks. A file system is any organization of data in a structured manner, which can be, but is not necessarily, organized in terms of a structured (e.g., hierarchical) set of stored files, directories and/or other types of data containers. Data stored by a storage server may be stored in the form of multiple blocks that each contains data. A block is the basic unit used by a file system in a storage server to manipulate and transfer data and/or metadata.

Figure 1:
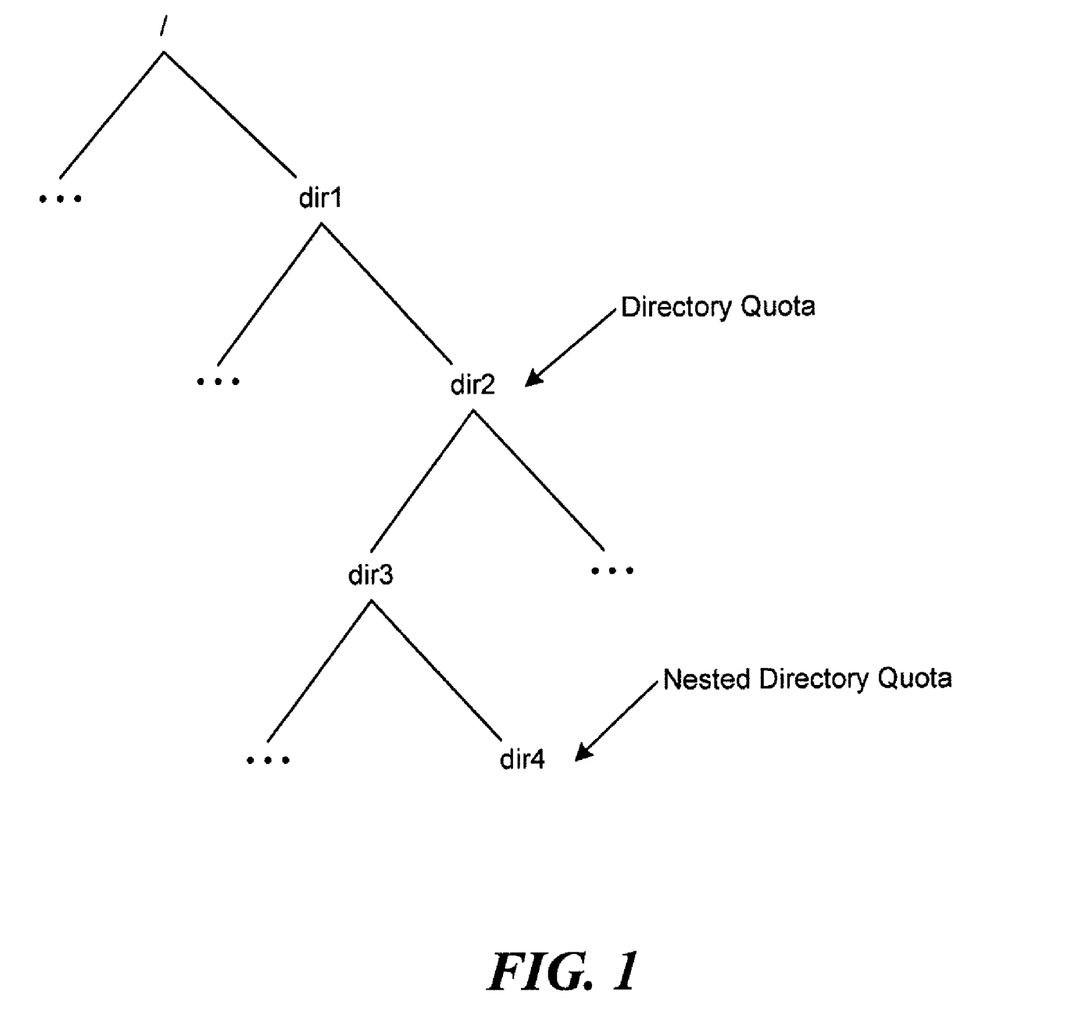
FIG. 1 depicts an example of setting directory quotas on directories.

Directory quota is an ability to set a file and/or disk block (storage) usage limit on a per directory basis, e.g., a limit on the usage by a particular user or a group for all files and sub-directories that reside under a given directory. The quota directory is not limited to being a directory at the root level of the file system (i.e. a directory under "/"), it can be at any level. As shown in FIG. 1, the directory quota need not to be set at dirt, it can be set at any level below or above dirt.

Directory quotas can be set on multiple directories which may or may not be nested. Nested directory quota refers to the situation where a directory quota is set on a directory and one or more of its parents (immediate or several levels up) also have directory quotas set on them. For a non-limiting example, if directory quotas are set for dir2 and dir4 in FIG. 1, these directory quotas form nested directory quotas and all files under dir4 need to be accounted for in the directory quota of dir2 as well as of dir4.

Common Internet File System (CIFS) is a standard protocol that lets clients make requests for files and services on remote computers on the Internet. CIFS uses the client/server programming model under which client program running on a host makes a request of a server (usually another host) for access to a file or to pass a message to a program that runs on the server and the server takes the request and returns a response. CIFS allows the client to get access to files that are local to the server and read and write to them, share files with other clients using special locks, and restore connections automatically in case of network failure. CIFS runs at a higher level than and uses the Internet's TCP/IP protocol and it is a complement to the existing Internet application protocols such as the File Transfer Protocol (FTP) and the Hypertext Transfer Protocol (HTTP). It provides a potentially more direct interface to server programs than currently available through the Web browser and its use of the HTTP protocol.

Maintaining directory quotas is relatively simple for CIFS since CIFS is a stateful protocol (in which part of the data that is exchanged between the client and the server includes state information) and file accesses happen via a file descriptor which is established via a call to the server using file names, so it is easy to track the file name in the handle of the call on the server. Further CIFS does not have a notion of a hard link, which is a reference, or pointer, to physical data on a storage volume, making the problem much simpler. The lack of hard links also makes the problem easier to solve on local Windows file systems.

Network File System (NFS) is a client/server protocol that lets a computer user view and optionally store and update files on a remote host as though the files were on the user's own host. The user's host needs to have an NFS client and the remote host needs to have an NFS server. Both the NFS server and client use TCP/IP and or UDP to transmit the files and updates back and forth. Using NFS, the user or a system administrator can mount all or a portion of a file system, making the mounted portion of the file system accessible by a user with access privileges, such as read-only or read-write, to each file.

Maintaining directory quotas for NFS (either in an NFS only environment or in a mixed environment) is difficult since NFS is a stateless protocol (in which neither the client nor the server has an obligation to keep track of the state information) and an operation on a file are done using file handles which are persistent identifiers for the file. Moreover, NFS has a notion of hard links which makes it possible for the file to have multiple parent directories, which makes directory quota implementations difficult since the server must have mechanisms to find all parent directories (i.e. all ancestors) of the file given the file's file handle, as any of the ancestors may have a directory quota set on them. This quota needs to be updated and verified before the file operation can complete. The existence of hard links also makes the problem much harder to solve for local file systems on most UNIX platforms because most UNIX file systems only have the ability to go from a directory to its parent directory, not the ability to go from the file to its parents.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 depicts an example of file creates in a file system having directory quotas turned on.

FIG. 7 depicts an example of file links in a file system having directory quotas turned on.

FIG. 9 depicts an example of file rename in a file system having directory quotas turned on.

DETAILED DESCRIPTION

The approach is illustrated by way of example and not by way of limitation in the figures of the accompanying drawings in which like references indicate similar elements. It should be noted that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A new approach to support efficient management of directory quotas for a file system is proposed. The approach adopts bitmasks for files and directories in a file system, and transforms the problem of maintaining and traversing complicated file system data structures into a simple bitmask comparison and an associated lookup. The approach of adopting bitmasks for files and directories in a file system applies to CIFS and NFS exported file systems (and other mechanisms to remotely access the files) as well as locally accessed file systems and is efficient in terms of performance. It transforms the problem of maintaining and traversing complicated file system data structures into a simple bitmask comparison and an associated lookup and removes the costly operations (traversing the file system parent path) from the critical path (e.g., file operations) and moves them to the time of administrative operation (switching the quotas on and off), which are infrequent and do not have the performance requirements of regular file operations. In addition, this unique approach to solve directory quotas not only avoids parent directory traversal and multiple disk block reads, it also avoids taking locks on inodes as a tree is traversed upwards, and it insures a lockless consistency in a multithreaded environment.

Figure 2:
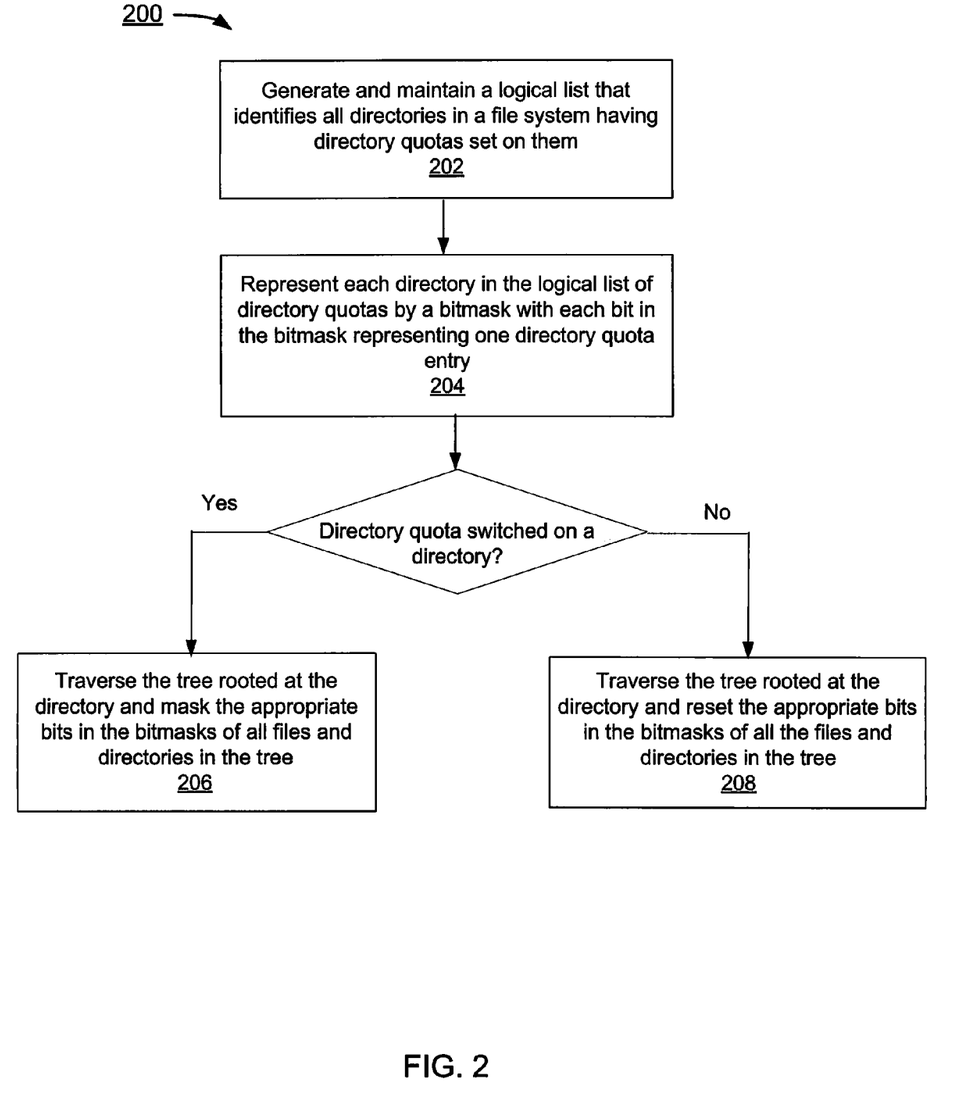
FIG. 2 depicts a flowchart of an example of a process to support management of directory quotas for a file system.

FIG. 2 depicts a flowchart 200 of an example of a process to support management of directory quotas for a file system. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

For the discussion herein, a tree is a data structure that emulates a tree structure with a set of linked nodes. It is an acyclic and connected graph. Each node in the tree represents a directory under the corresponding file system, and each node in the tree has zero or more child nodes, representing sub-directories in the parent directory. The topmost node in the tree represents the root directory of the file system.

In the example of FIG. 2, the flowchart 200 starts to block 202 where a logical list is generated and maintained, wherein the logical list identifies all the directories in the file system that have directory quotas set on them. The logical list needs to be maintained such that the position of any particular directory quota entry remains the same until the directory quota represented by the entry is disabled and/or is reused for a different directory quota. While the information about the different directory quotas needs to be maintained persistently in non-volatile storage, such information may be cached in volatile storage (e.g., memory) for efficiency.

In the example of FIG. 2, the flowchart 200 continues to block 204 where each directory in the logical list of directory quotas is represented by a bit in the bitmask, wherein binary value of the bit indicates whether directory quota on a specific directory is on (enforced) or not. A mask is some data that, along with an operation, is used in order to extract information stored elsewhere. The most common bitmask used extracts the status of certain bits in a binary string or number (a bit field or bit array). Here, each bit in the bitmask representing on/off of a particular directory quota remains the same until the directory quota entry is reused or the root of the directory quota is deleted (for a non-limiting example, one mode of operation could be to prevent deletion of directory entries that have directory quotas enabled).

In some embodiments, the bitmask can be maintained per inode as a part of an inode associated with the file or directory. An inode is a data structure that stores basic information (e.g., metadata) about a regular file, directory, or other file system object on a file system, such as ownership of the file, access permission for the file, size of the file, file type, and pointers used to locate the data blocks for the file. Each file or directory has an inode and is identified by an inode number in the file system where the inode resides. Storing a bitmask in an inode makes the handling of the bitmask very fast.

In the example of FIG. 2, once directory quota is switched on a directory, meaning check on quota of the directory is to be enforced, the flowchart 200 continues to block 206 where the tree rooted at that directory is traversed and the appropriate bits are marked in the bitmasks of all the files and directories in the tree. Such traversal of the tree rooted at the directory does not add additional time or cost since it would be required anyway to calculate the current quota usage for the files in the tree. Once all the inodes have been marked, the directory quota is declared functional on the directory.

In the example of FIG. 2, once the directory quota is switched off on a directory, the flowchart 200 continues to block 208 where the tree rooted at that directory is traversed and the appropriate bits are reset in the bitmasks in all the file and directory inodes in the tree. Here, traversing the tree means visiting and obtaining (e.g., reading) information at nodes in the tree in, for non-limiting examples, a breadth first or depth first manner. It should be noted that once a directory quota is switched off, the corresponding bit cannot be used for a new directory quota until the task of resetting the bitmasks from all inodes is completed.

Since an inode typically has stringent space constraints, a bitmask of size 32 or 64 bits is most suitable for storing in the inode. If a larger number of directory quotas are required, it would be better to store the bitmask in an auxiliary data structure, which can be but is not limited to, one or more of: a separate auxiliary data-structure associated with the file, such as a named data stream, a named attribute or alternate data stream, and as a separate piece of meta-data that tracks the bitmasks for all files as a single logical structure (e.g. a separate metadata file). If the bitmask is maintained outside of the inode, a single bit flag could be maintained in the inode (for efficiency) to indicate whether or not any directory quotas which affect the inode are active. Regardless of the forms in which the bitmask is maintained (either inside or outside of the inode), the bitmask needs to be maintained in a persistent manner, e.g., on a non-volatile persistent storage.

Figure 3:
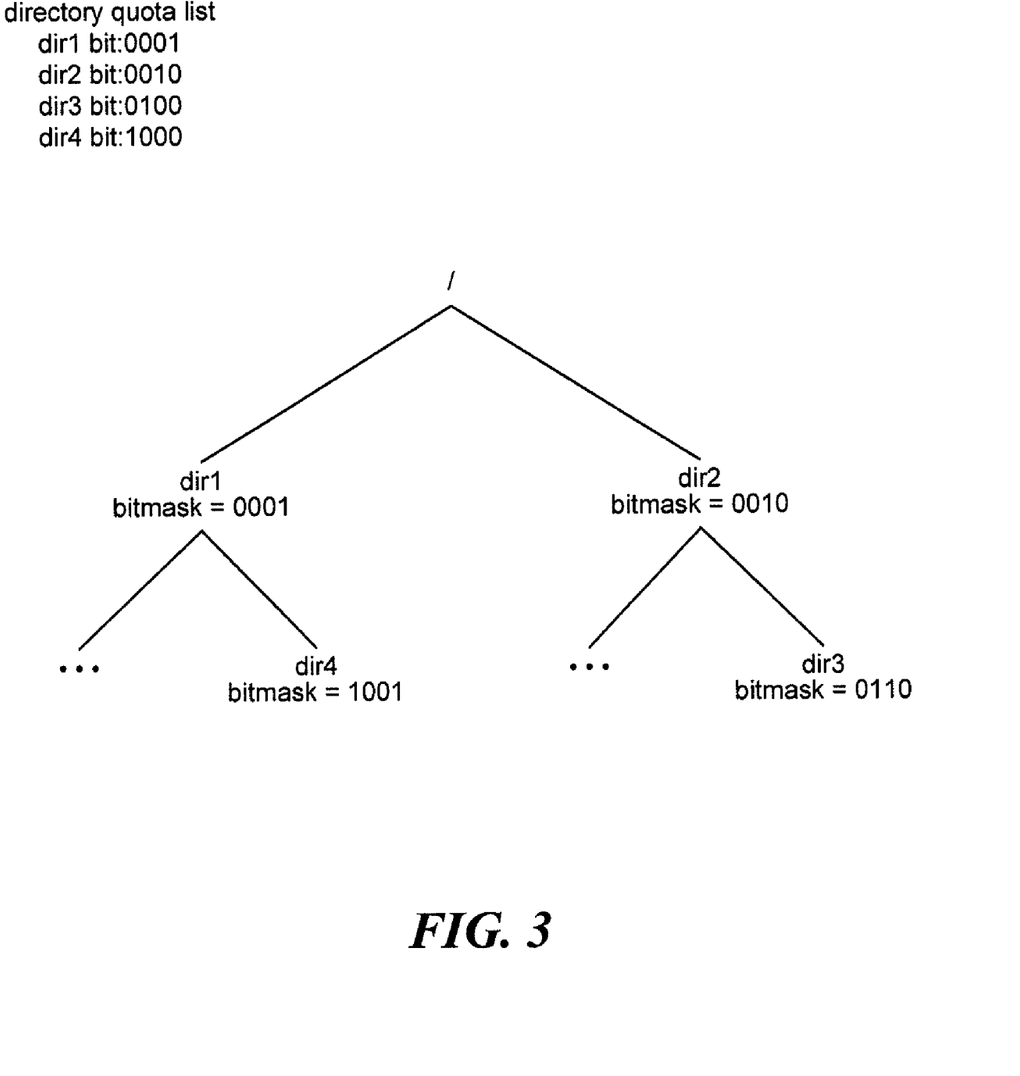
FIG. 3 depicts an example of representing quotas of directories in a file system via bitmasks.

FIG. 3 depicts a non-limiting example of representing quotas of directories in a file system via bitmasks. In the example of FIG. 3, a logical list of directory quotas identifies dir1, dir2, dir3, and dir4, each having a directory quotas set on it. Each of the directories can be represented by a bitmask with the bit corresponding to the directory whose quota is on being set as '1' in the bitmask, e.g., 0001 for dir1 0010 for dir2, 0100 for dir3, and 1000 for dir4. Once directory quota on dir1 and dir2 are switched on, the trees rooted at dir1 and dir2 are traversed (e.g., in a breadth first or depth first manner) to set appropriate bits in the bitmasks of sub-directories. In this example, dir4 and dir3 in the trees rooted at dir1 and dir2, are set as 1001 and 0110, by performing a logical AND of the bitmasks of dir1 (0001)/dir4(1000) and dir2(0010)/dir3(0100), respectively. Here, bitmask 0110 for dir 3 indicates that directory quota on dir2 and dir3 are on, and bitmask 1001 for dir4 indicates that directory quota on dir1 and dir4 are on.

In some embodiments, when specific operations that require a quota update and check are performed on a file or directory, the bitmask corresponding to the file or directory identifies the directories which quotas need to be consulted and updated. For the example shown in FIG. 3, if a file operation is performed on dir3, bitmask 0110 corresponding to dir3 indicates that quotas on directories dir2 and dir3 need to be consulted and updated without requiring the costly traversal of the file system in which dir3 is located to identifies these directories (e.g., dir2 and dir3) while a timing critical file operation is being performed.

Figure 4:
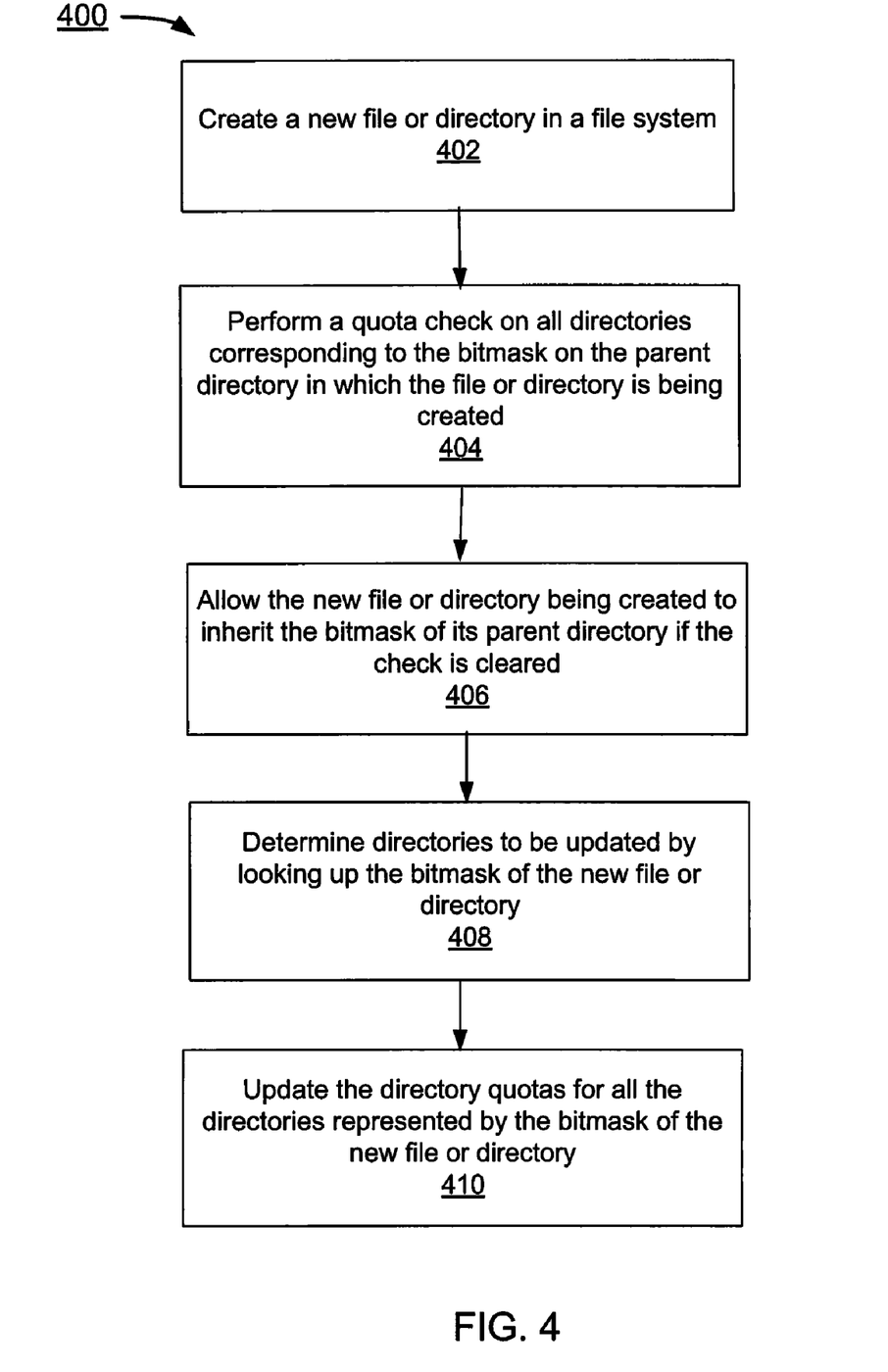
FIG. 4 depicts a flowchart of an example of a process to support management of directory quotas for file and directory create.

FIG. 4 depicts a flowchart 400 of an example of a process to support management of directory quotas for file and directory create. In the examples of FIG. 4, the flowchart 400 starts at block 402 where a new file or directory is being created in a file system. The flowchart 400 continues to block 404 where a quota check is performed against all directories corresponding to the bitmask on the parent directory in which the file or directory is being created. The flowchart 400 continues to block 406 where the new file (or directory) being created will include as a whole of the bitmask of its parent directory if the check is cleared, e.g., there are sufficient quota in the directories checked to accommodate the newly created file or directory. The flowchart 400 continues to block 408 where directories to be updated are determined by looking up the bitmask of the new file or directory. The flowchart 400 ends at block 410 where the directory quotas are updated for the directories (represented by the bitmask of the new file or directory) to reflect the storage to be occupied by the newly created file or directory.

Figure 5:
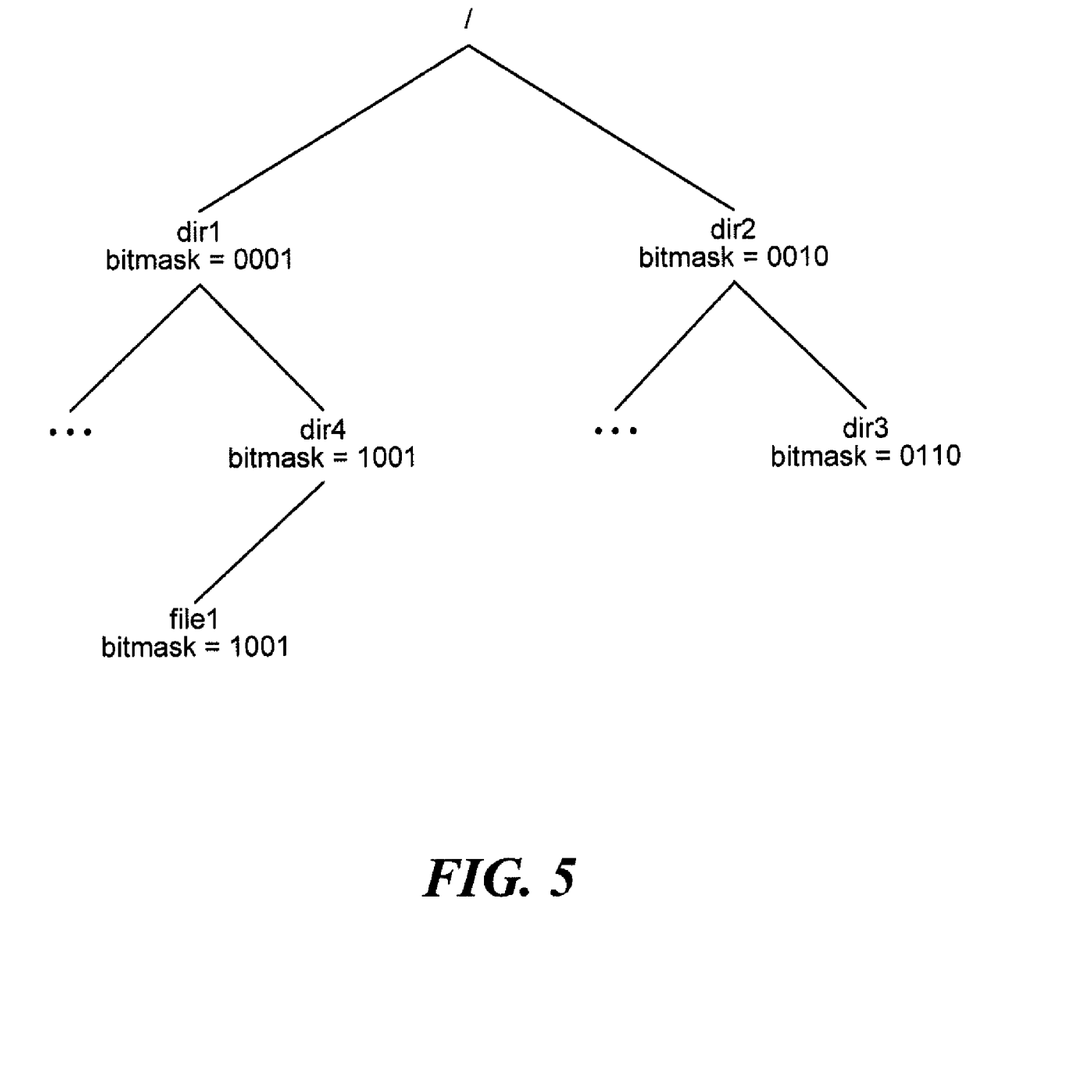

FIG. 5 depicts a non-limiting example of a process for creating a file in a file system having directory quotas turned on. In the example of FIG. 5, a new file, file1, is created under dir4. Once quota checks on the directories corresponding to the bitmask of its parent directories—din and dir4—are cleared, the newly created file1 include as a whole of the bitmask of dir4—1001. The bitmask 1001 indicates that din and dir4 corresponding to '1' bits in the bitmask need to be updated to reflect the creation of file1 (e.g., quotas on din and dir4 should be reduced by the storage amount file1 occupies).

Figure 6:
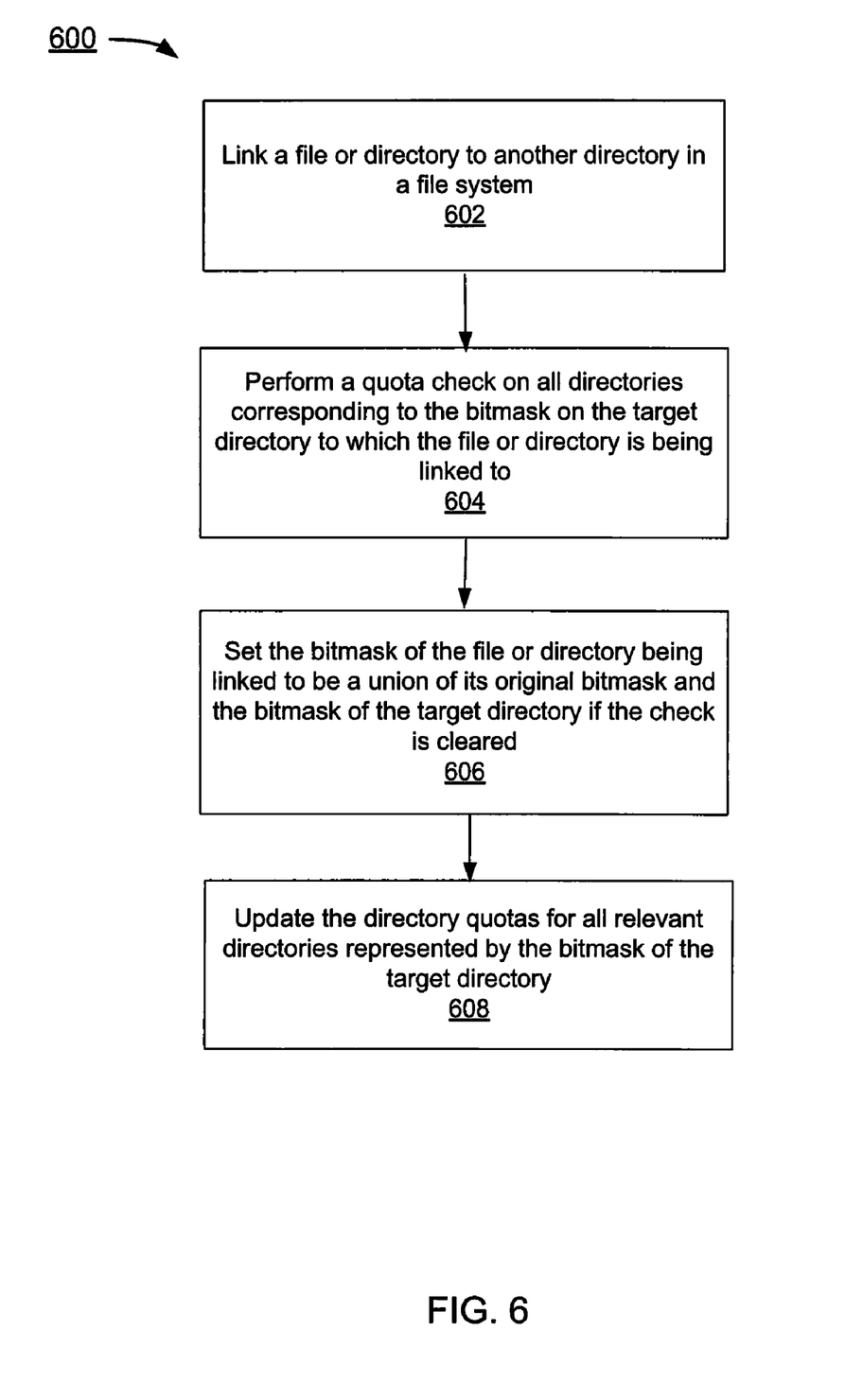
FIG. 6 depicts a flowchart of an example of a process to support management of directory quotas for file and directory link.

FIG. 6 depicts a flowchart 600 of an example of a process to support management of directory quotas for file and directory link. In the examples of FIG. 6, the flowchart 600 starts at block 602 where a file or directory is being linked to another file or directory in a file system. The flowchart 600 continues to block 604 where a quota check is performed against all the directories corresponding to the bitmask on the target directory to which the file or directory is being linked to. If the check is cleared, the flowchart 600 continues to block 606 where the link causes the file's bitmask to be a union of its original bitmask and the target directory's (target of the link operation) bitmask. The flowchart 600 ends at block 608 where the directory quotas are updated for the relevant directories of the target directory (represented by the bitmask of the target directory). Under the approach outlined in FIG. 6, the bits assigned to individual directories with directory quotas only need to be unique for a particular file system. In contrast, such bits have to be globally unique under other existing file systems where links across file systems are not permitted.

Figure 7:
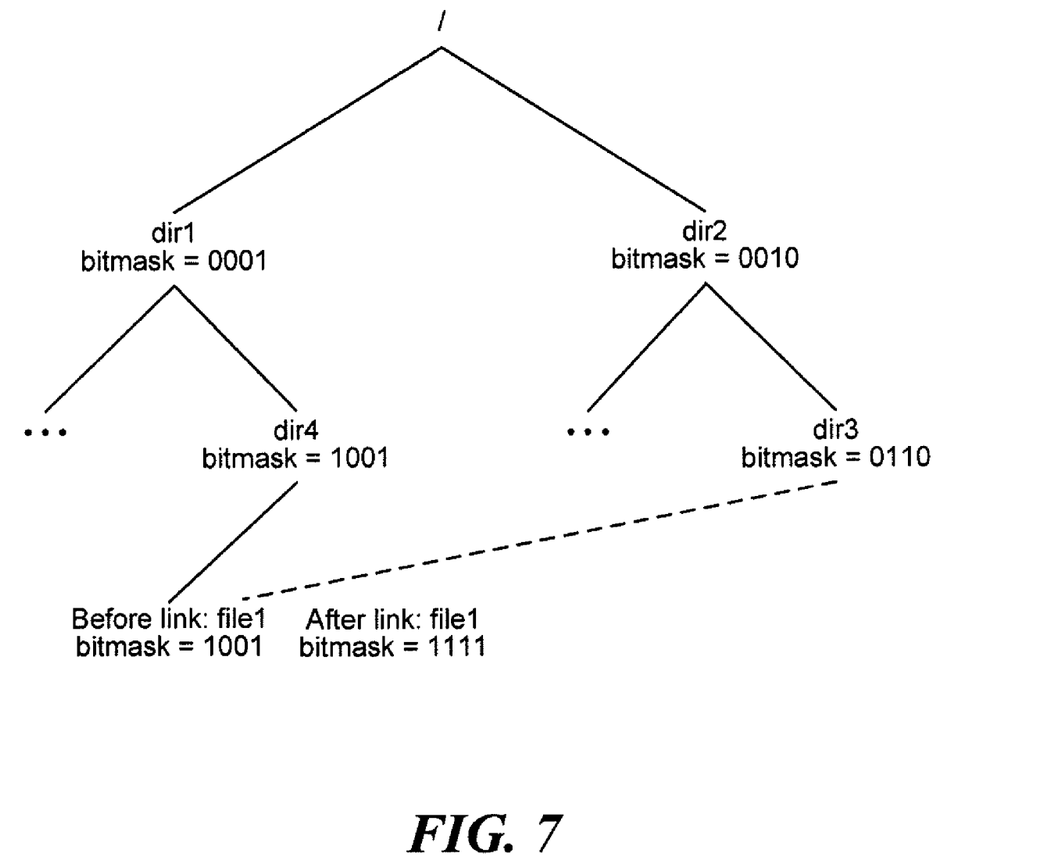

FIG. 7 depicts a non-limiting example of file links in a file system having directory quotas turned on. In the example of FIG. 7, file1 under dir4 is being linked to dir3 (while still remaining under dir4). Once quota check on the directories corresponding to the bitmask of the target directory dir3 is cleared, i.e., directory quota on dir3 is enough to accommodate the storage requirement of file1, the bitmask of file1 after the link is the union of its original bitmask 1001 (e.g., bitmask of dir4 where it currently resides) and the bitmask of the target directory (e.g., directory to which the file is linked to) dir3—0110. Consequently, the new bitmask of file1 after the link becomes 1111, which is the result of a logical AND operation performed on the original bitmask 1001 of dir4 and the bitmask of dir3.

Figure 8:
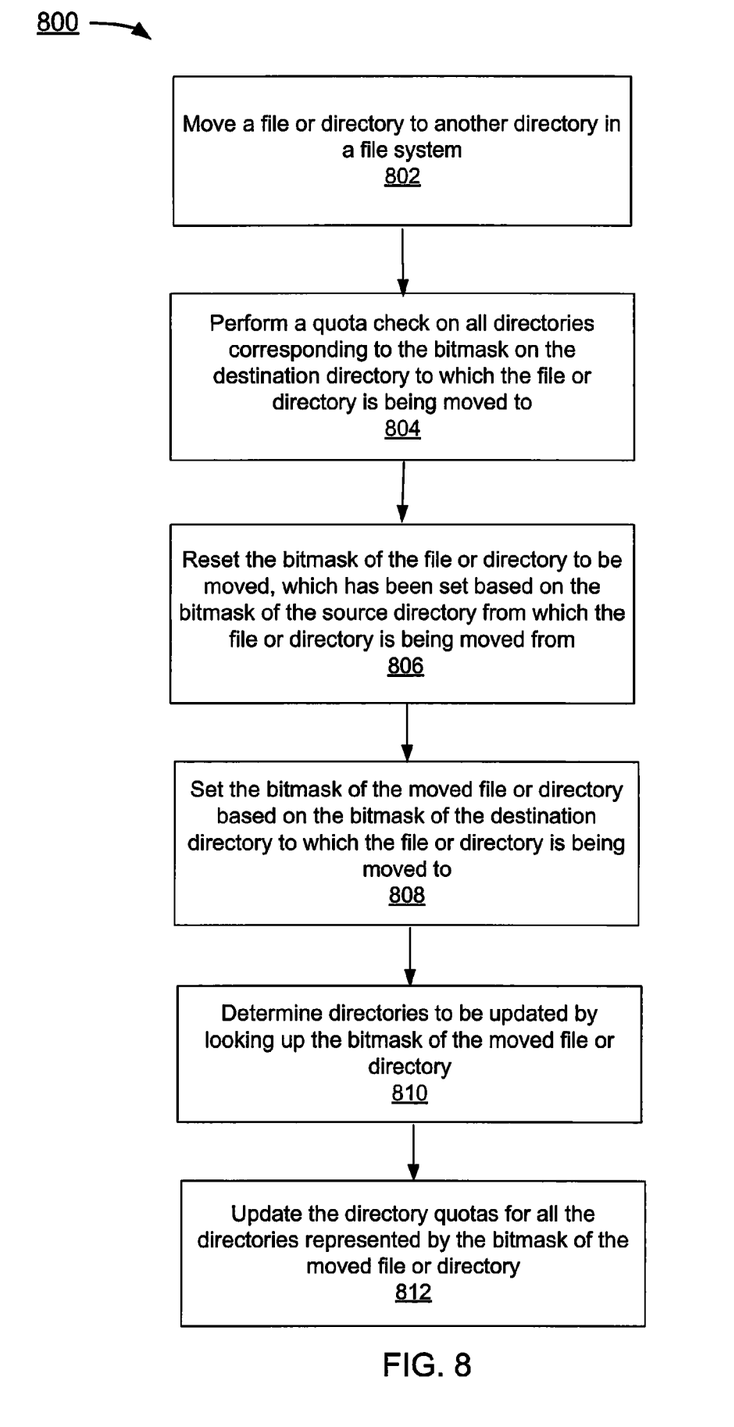
FIG. 8 depicts a flowchart of an example of a process to support management of directory quotas for file and directory rename.

FIG. 8 depicts a flowchart 800 of an example of a process to support management of directory quotas for file and directory rename. In the examples of FIG. 8, the flowchart 800 starts at block 802 where a file or directory is being renamed, e.g., moving to another directory, in a file system. The flowchart 800 continues to block 804 where a quota check is required against directories corresponding to the bitmask on the target directory in which the file or directory is being renamed (moved) to. If the check is cleared, the flowchart 800 continues to block 806 where the bitmask of the file or directory to be renamed, which was set based on the bitmask of the source directory from which the file or directory to being renamed, is reset. The flowchart 800 continues to block 808 where the bitmask of the renamed file or directory is set based on the bitmask of the target directory to which the file or directory is being renamed, e.g., the file may include as a whole of the bitmask of its target directory as discussed under the scenario of FIGS. 4 and 5. The flowchart 800 continues to block 810 where directories to be updated are determined by looking up the bitmask of the moved file or directory. The flowchart 800 ends at block 812 where the directory quotas are updated for all the directories represented by the bitmask of the moved file or directory. In some embodiments, an update may involve deducting the storage size of the renamed file or directory from the quota of the target directory.

Figure 9:
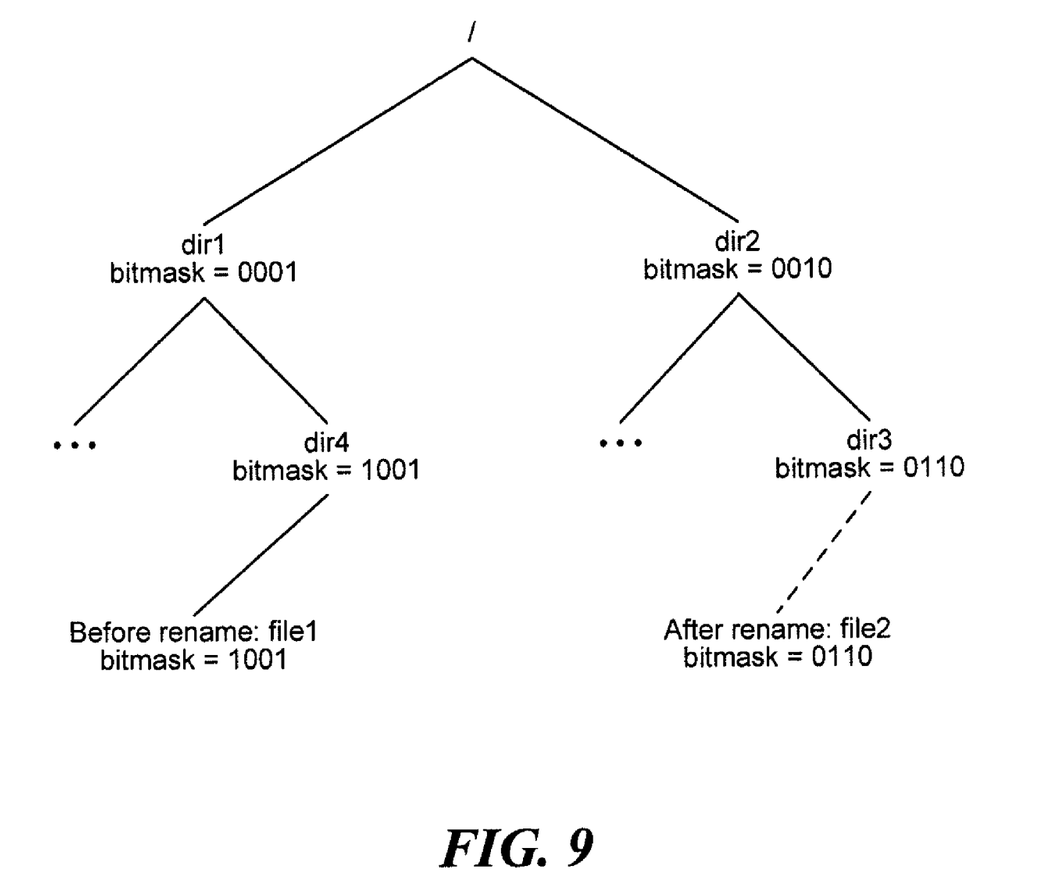

FIG. 9 depicts a non-limiting example of file rename process in a file system having directory quotas turned on. In the example of FIG. 9, file1 under dir4 is being renamed (moved) to dir3. Once quota check on the directories corresponding to the bitmask of dir3 is cleared, the present bitmask of file1 under dir4—1001 is reset and file1 takes on the bitmask of the target directory dir3—0110 after the rename. Based on the bitmask of dir3, quotas on dir2 and dir3, which correspond to the '1' bits in the bitmask 0110 can be updated.

Note that create, link, and rename are used here as non-limiting examples of specific operations that require a quota update and check are performed on a file. Other operations that will also benefit from assigning bitmasks to directories with quotas include but are not limited to, write, truncate, and "hole punching" (e.g., modify or delete files in a directory) where the quota check and update can happen by referring to the relevant bitmask.

Figure 10:
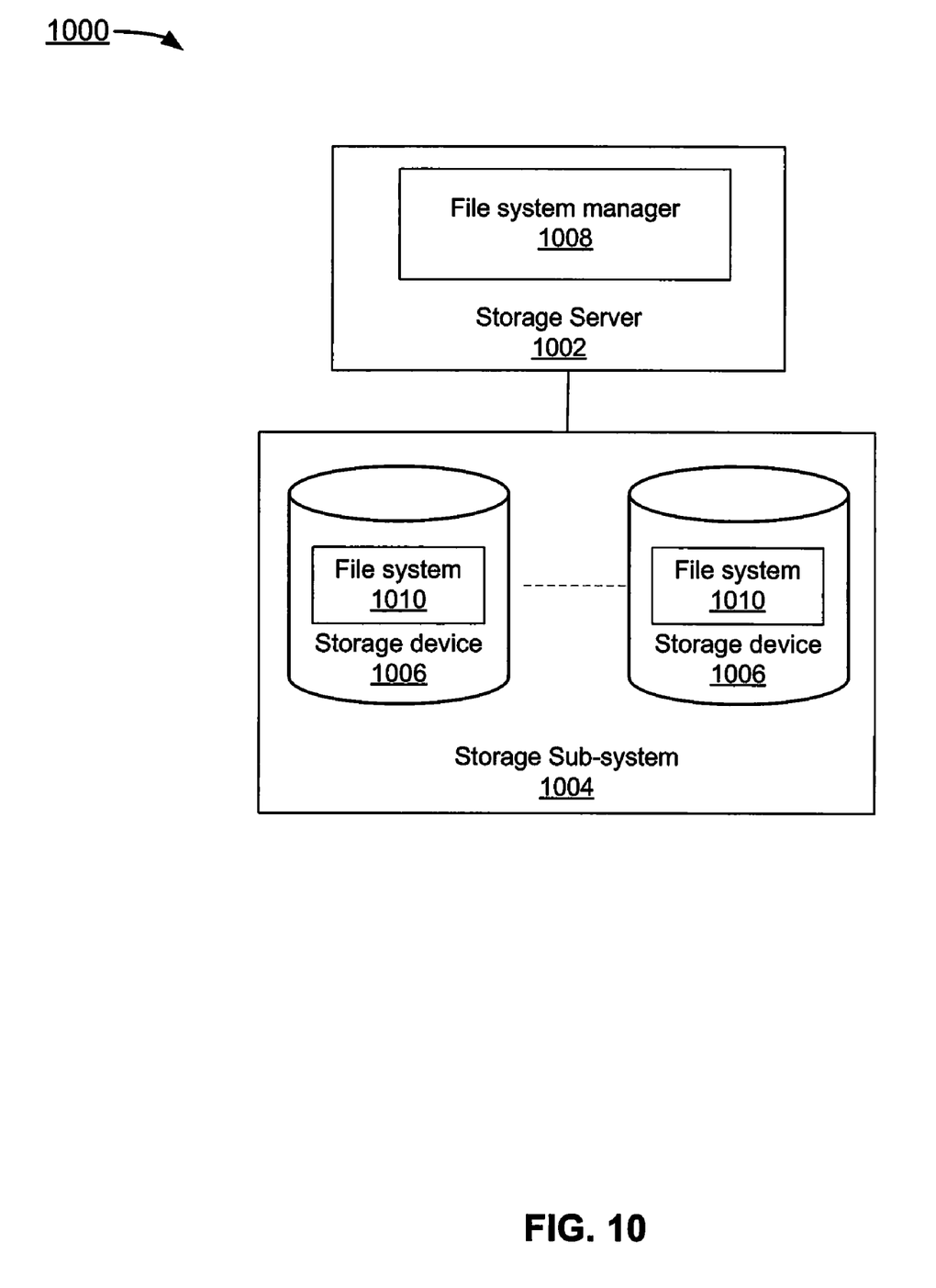
FIG. 10 depicts an example of a system to support management of directory quotas for a file system.

FIG. 10 depicts an example of a system 1000 to support management of directory quotas for a file system. Although the diagrams depict components as functionally separate, such depiction is merely for illustrative purposes. It will be apparent to those skilled in the art that the components portrayed in this figure can be arbitrarily combined or divided into separate components.

In the example of FIG. 10, the configuration 1000 includes a storage server 1002, coupled with a mass storage subsystem 1004, which includes one or more mass storage devices 1006. A file system manager 1008 running on the storage server 1002 manages a file system 1010 comprising a set of files and directories (not shown) on one of the mass storage devices 1006.

In the example of FIG. 10, the mass storage devices 1006 in the mass storage subsystem 1004 may be, for a non-limiting example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

In the example of FIG. 10, the mass storage subsystem 1004 is managed by the storage server 1002. For a non-limiting example, the storage server 1002 may receive and respond to various read and write requests from the file system manager 1008 directed to the file system 1010 on one of the mass storage devices 1006 in the storage subsystem 1004.

In the example of FIG. 10, The file system manager 1008 is software component that keeps track of the directory structure (hierarchy) of the file system 1010 in the storage subsystem 1006 and manages read/write operations on the files in the file system 1010 (i.e. executes read/write operations on the disks in response to client requests). More importantly, the file system manager generates and maintains a list of files and directories in the file system 1010 with directory quotas set on them. Each file or directory on the list is represented by a bitmask, wherein each bit in the bitmask represents one directory quota entry for the corresponding directory in the file system.

While the system 1000 depicted in FIG. 10 is in operation, the file system manager 1008 traverses a tree rooted at a directory which directory quota has been switched on or off in the file system 1010 on a mass storage device 1006 in a storage sub-system 1004. For non-limiting examples, the traversal of the tree can be performed in a breadth-first, a depth-first, or any other suitable manner. During such traversal of the tree, the appropriate bit in the bitmask of each file or directory in the tree is marked or reset accordingly to reflect of the directory quota at the root. When an operation that requires a quota update and check is performed on a file or directory (e.g., create, link, or move the file or directory), the file system manager 1008 provides a list of directory quotas that need to be consulted and updated via the bitmask corresponding to the file, and performs a quota check on directories corresponding to a bitmask on the parent or target directory in which the file or directory is being created, linked to, or moved to. When a new file or directory is being created, the file system manager 1008 lets the newly created file or directory to include as a whole of the bitmask of its parent if the quota check is cleared. When a file or directory is linked to another in the file system 1010, the file system manager 1008 sets the new bitmask of the linked file or directory to be a union of its original bitmask and the target directory's bitmask if the check is cleared. In one embodiment, a logical AND operation is performed for the union, but those skilled in the art would understand that other ways of union of two bitmasks may also apply. When a file or directory is moved to another in the file system 1010, the file system manager 1008 resets the bitmask of the file or directory to be moved, which has been set based on the bitmask of the source directory from which the file or directory is being moved from, and sets the bitmask of the moved file or directory based on the bitmask of the target directory to which the file or directory is being moved to. Once the file operation is complete, the file system manager 1008 updates directory quotas of relevant directories represented by the bitmask of the directory to which a file or directory is being created, linked to, or moved to, to reflect storage to be occupied by the file or directory in the file system 1010.

The important advantage of using bitmask for directory quota is that, when a file operation that may affect directory quota is performed on a file or directory, the files and/or directories that are affected and thus need to be checked are immediately available via the bitmask. Consequently, there is no need to traverse the file system to find out which directories or files are affected during file operation, which is costly. Instead, the bitmasks can be generated during "off time", when the directory quotas are switched on or off.

Figure 11:
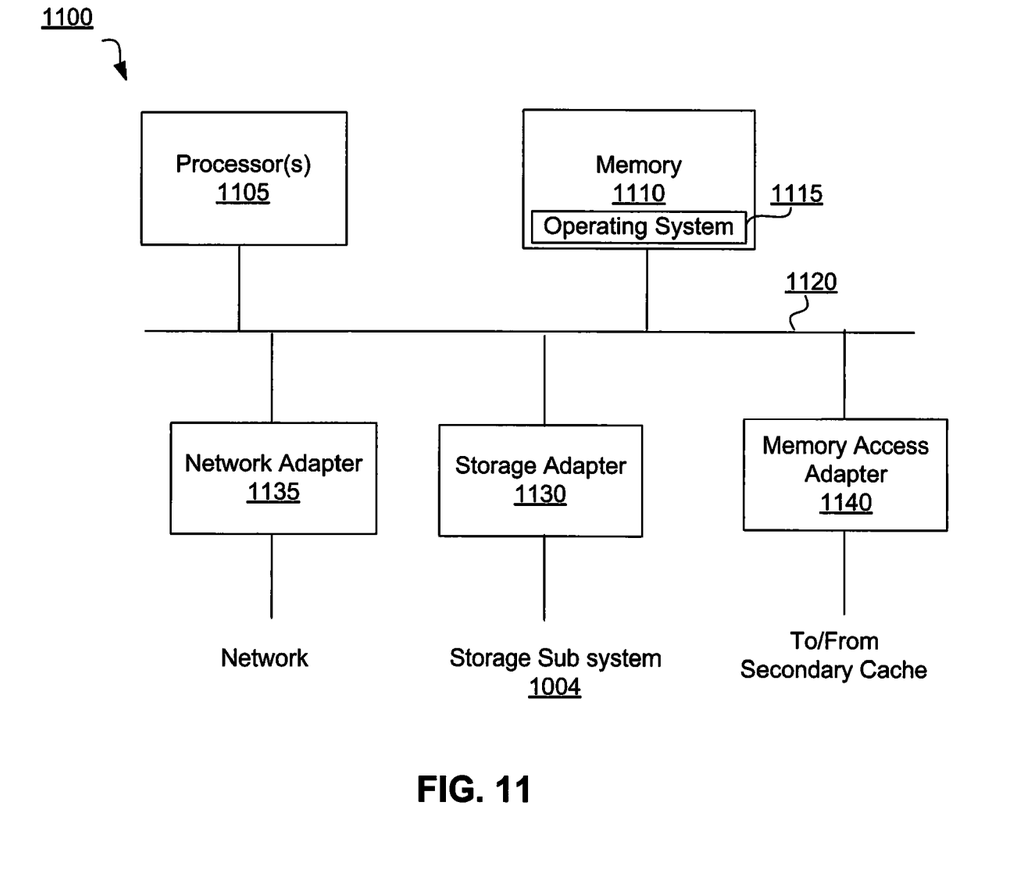
FIG. 11 is a high-level block diagram showing an example of the architecture of a storage server.

FIG. 11 is a high-level block diagram showing an example of the architecture of a storage server 1100 (1002 in FIG. 10). The storage server 1100 includes one or more processors 1105 and memory 1110 coupled to a interconnect 1120. The interconnect 1120 shown in FIG. 11 is an abstraction that represents any of one or more separate physical buses, point-to-point connections, or both connected by appropriate bridges, adapters, or controllers. The interconnect 1120, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

In the example of FIG. 11, the processor(s) 1105 may include central processing units (CPUs) of the storage server 1100 and, thus, control the overall operation of the storage server 1100. In certain embodiments, the processor(s) 1105 accomplish this by executing software or firmware stored in memory 1110. The processor(s) 1105 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In the example of FIG. 11, the memory 1110 is or includes the main memory of the storage server 1100. The memory 1110 represents any form of random access memory (RAM), read-only memory (ROM), flash memory, or the like, or a combination of such devices. In use, the memory 1110 stores, among other things, the operating system 1115 of the storage server 1100.

In the example of FIG. 11, the storage server 1100 may have a distributed architecture; for a non-limiting example, storage server 1100 may include separate N-module (network adapter 1135) and D-module (storage adapter 1130), both connected to the processor(s) 1105 through the interconnect 1120. In such an embodiment, the network adapter 1135 provides the storage server 1100 with the ability to communicate with remote devices over a network and may be, for a non-limiting example, a Fibre Channel adapter or a SCSI adapter (not shown), while the storage adapter 1130 includes the file system functionality and is used to communicate with the storage subsystem 1004. In another embodiment, the storage server 1100 may have an integrated architecture, where the network and data components are all contained in a single box or unit. The storage server 1100 further may be coupled through a switching fabric to other similar storage systems (not shown) that have their own local storage subsystems. In this way, all of the storage subsystems can form a single storage pool, to which any client of any of the storage systems has access.

In the example of FIG. 11, the storage server 1100 also includes a memory access adapter 1140 coupled to the interconnect 1120, to enable the processor(s) 1105 to access the secondary cache (not shown). In some embodiments, the secondary cache is external to the storage server 1100. In other embodiments, the secondary cache is physically attached to the main motherboard (not shown) of the storage server 1100. In still other embodiments, the secondary cache is implemented on a separate substrate within the storage server 1100 or on a substrate that attaches to a connector on the storage server 1100.

Figure 12:
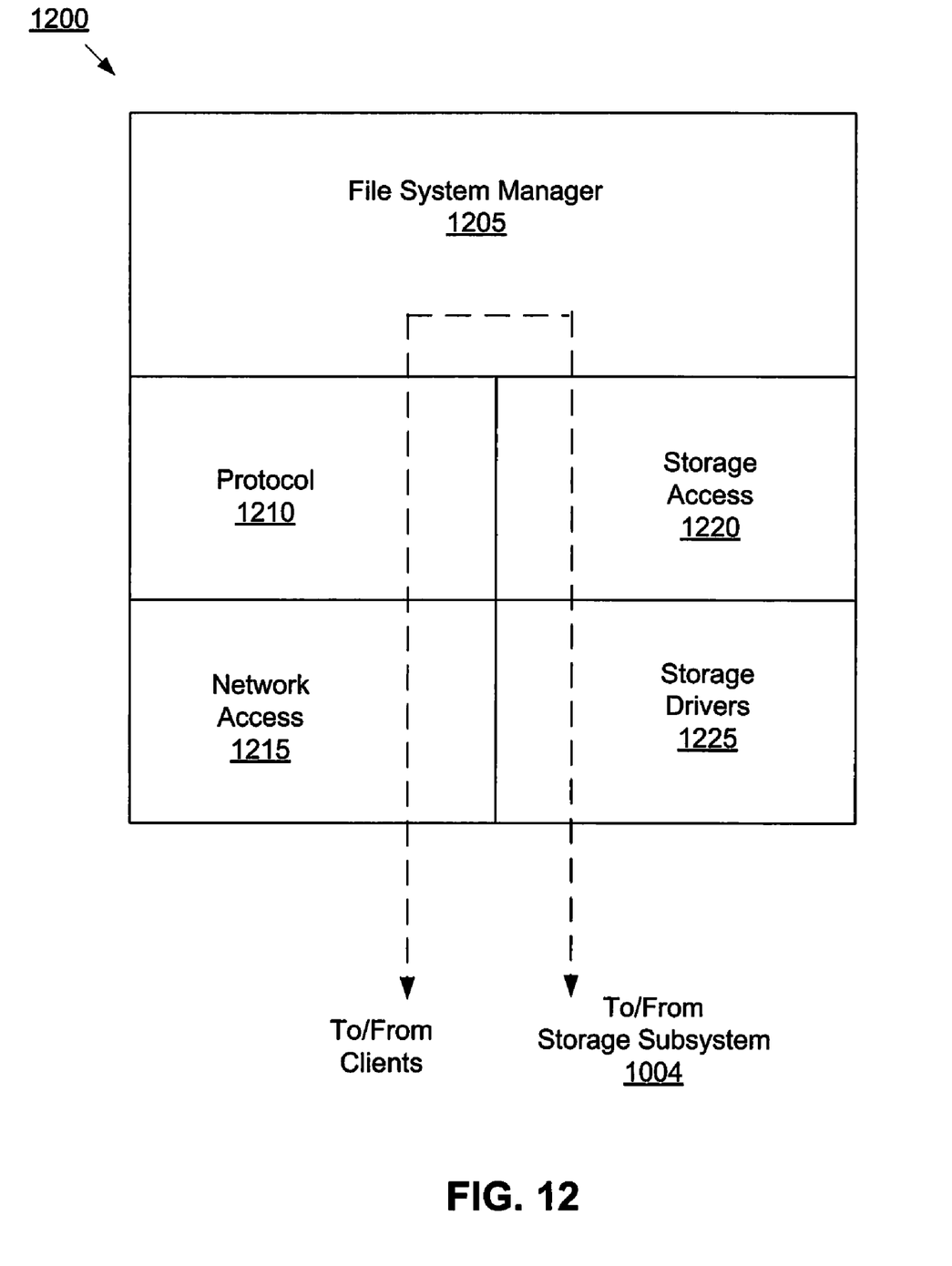
FIG. 12 illustrates an example of the operating system of the storage server.

FIG. 12 illustrates an example of the operating system 1200 of the storage server 1100. As shown, the operating system 1200 includes several modules, or "layers." These layers include a file system manager 1205 (1008 in FIG. 10), a protocol layer 1210, and an associated network access layer 1215, to allow a file server to communicate over a network to other systems, such as clients. The protocol layer 1210 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 1215 includes one or more drivers, which implement one or more lower-level protocols to communicate over the network, such as Ethernet. Interactions between clients and mass storage devices (e.g., disks) are illustrated schematically as a path, which illustrates the flow of data through the operating system 1200.

The operating system 1200 further includes a storage access layer 1220 and an associated storage driver layer 1225 to allow a file server to communicate with a storage subsystem 1004. The storage access layer 1220 implements a higher-level disk storage protocol, such as RAID, while the storage driver layer 1225 implements a lower-level storage device access protocol, such as Fibre Channel Protocol (FCP) or SCSI. In one embodiment, the storage access layer 1220 may implement a RAID protocol, such as RAID-4 or RAID-DP™ (RAID double parity for data protection provided by NetApp, Inc.), and therefore may alternatively be referred to as RAID layer 1220.

Thus, a method and apparatus to support efficient management of directory quotas for a file system via bitmasks has been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for managing directory quotas in a storage server employing a stateless client/server protocol, the method comprising:
generating and maintaining a logical list that identifies directories in a file system employing the stateless client/server protocol, wherein the file system has directory quotas set on the directories;
representing each directory in the logical list of directory quotas by a bitmask, wherein each bit in the bitmask represents a directory quota status of a corresponding directory of the file system, the directory quota status of a given directory indicating whether a particular directory quota has been imposed on the given directory, wherein the bitmask representation enables imposition of a nested directory quota at any level of a directory structure of the file system employing the stateless client/service protocol;
performing an operation on a file or directory;
determining directories to be consulted and/or updated for the operation by looking up bitmask of the file or directory without traversing the directories of the file system;
consulting and/or updating quotas of the directories for the operation.

2. A method as recited in claim 1, further comprising:
traversing a tree rooted at a directory whose directory quota is switched on and marking the appropriate bits in the bitmasks of files and directories in the tree.

3. A method as recited in claim 1, further comprising:
traversing a tree rooted at a directory whose directory quota is switched off and reset the appropriate bits in the bitmasks of the files and directories in the tree.

4. A method as recited in claim 1, further comprising:
maintaining the bitmasks of the files and directories in a persistent manner.

5. A method as recited in claim 1, further comprising:
maintaining the bitmask of a file or directory in a data structure associated with the file or directory.

6. A method as recited in claim 5, wherein:
the data structure is an inode associated with the file or directory.

7. A method as recited in claim 1, further comprising:
providing a list of directory quotas that need to be consulted and updated via the bitmask corresponding to a file on which an operation that requires a quota update and check is performed.

8. A method for managing directory quotas in a storage server employing a stateless client/server protocol, the method comprising:
creating a new file or directory in a file system employing the stateless client/server protocol;
performing a quota check on directories corresponding to a bitmask on a parent directory in which the file or directory is being created, wherein each bit in the bitmask represents a directory quota status of one of the directories corresponding to the parent directory, wherein the directory quota of a given directory indicates whether a particular directory quota has been imposed on the given directory, wherein the bitmask representation enables imposition of a nested directory quota at any level of a directory structure of the file system employing the stateless client/service protocol;

allowing the newly created file or directory to include as a whole of the bitmask of the parent directory if the quota check is cleared;

determining directories to be updated by looking up the bitmask of the file or directory without traversing the file system;

updating directory quotas of the directories represented by the bitmask of the file or directory to reflect storage to be occupied by the newly created file or directory in the file system.

9. A method as recited in claim 1, further comprising:
determining the directories to be updated as those corresponding to '1' bits in the bitmask.

10. A method as recited in claim 8, wherein:
the quota check is cleared if there is sufficient quota in the directories checked to accommodate the newly created file or directory.

11. A method for managing directory quotas, comprising:
linking a file or directory to another directory in a file system;

performing a quota check on directories corresponding to a bitmask on a target directory to which the file or directory is being linked to;

setting the bitmask of the file or directory being linked to be a union of its original bitmask and the bitmask of the target directory if the quota check is cleared;

updating directory quotas of relevant directories represented by the bitmask of the target directory.

12. A method for managing directory quotas in a storage server employing a stateless client/server protocol, the method, comprising:

moving or renaming a file or directory to another directory in a file system employing the stateless client/server protocol;

performing a quota check on directories corresponding to a bitmask of a target directory to which the file or directory is being moved to, wherein each bit in the bitmask represents a directory quota status of one of the directories corresponding to the target directory, wherein the directory quota of a given directory indicates whether a particular directory quota has been imposed on the given directory, wherein the bitmask representation enables imposition of a nested directory quota at any level of a directory structure of the file system employing the stateless client/service protocol;

resetting the bitmask of the file or directory to be moved, if the quota check is cleared;

setting the bitmask of the moved file or directory based on the bitmask of the target directory to which the file or directory is being moved to;

determining directories to be updated by looking up the bitmask of the moved file or directory;

updating directory quotas for the directories represented by the bitmask of the moved file or directory.

13. A method as recited in claim 12, further comprising:
determining the directories to be updated as those corresponding to '1' bits in the bitmask.

14. A method as recited in claim 12, wherein:
the bitmask to be reset has been set based on a bitmask of a source directory from which the file or directory is being moved from.

15. A system for managing directory quotas, in a storage server employing a stateless client/server protocol, the system comprising:

a storage sub-system coupled with a storage server, wherein the storage sub-system includes a storage device;

said storage server operable to manage the storage subsystem;

a file system comprising of a set of files and directories on the storage device, the file system employing the stateless client/server protocol;

a file system manager embedded in a machine readable medium, which while in operation,
generates and maintains a logical list that identifies directories in the file system having directory quotas set on the directories;
represents each directory in the logical list of directory quotas by a bitmask, wherein each bit in the bitmask represents a directory quota status of a corresponding directory in the file system, wherein the directory quota of a given directory indicates whether a particular directory quota has been imposed on the given directory, wherein the bitmask representation enables imposition of a nested directory quota at any level of a directory structure of the file system employing the stateless client/service protocol.

16. A system as recited in claim 15, wherein:
the storage device in the storage subsystem is one of: a magnetic disk, an optical disk such as a compact disk-read only memory (CD-ROM) or a digital versatile/video disks (DVD)-based storage, a magneto-optical (MO) storage, a tape-based storage, and any other type of non-volatile storage device suitable for storing large quantities of data.

17. A system as recited in claim 15, wherein:
the file system includes one or more of: a Common Internet File System (CIFS), a Network File System (NFS), any other network file system, and a local file system.

18. A system as recited in claim 15, wherein:
the file system manager traverses a tree rooted at a directory whose directory quota is being switched on or off to mark or reset the appropriate bits in the bitmasks of files and directories in the tree, respectively.

19. A system as recited in claim 15, wherein:
the file system manager maintains the bitmask of a file or directory in an inode associated with the file or directory.

20. A system as recited in claim 15, wherein:
the file system manager provides a list of directory quotas that need to be consulted and updated via the bitmask corresponding to a file on which an operation that requires a quota update and check is performed.

21. A system as recited in claim 15, wherein:
the file system manager performs a quota check on directories corresponding to a bitmask on a directory in which another file or directory is being created, linked to, or moved to.

22. A system as recited in claim 21, wherein:
the file system manager allows a newly created file or directory to include as a whole of the bitmask of the directory in which the file or directory is being created if the quota check is cleared.

23. A system as recited in claim 21, wherein:
the file system manager sets the bitmask of a file or directory being linked to the directory be a union of the original bitmask of the file or directory and the bitmask of the directory if the quota check is cleared.

24. A system as recited in claim 21, wherein:
the file system manager resets the bitmask of a file or directory to be moved to the directory if the quota check is cleared, wherein the bitmask has been set based on a bitmask of a directory from which the file or directory is being moved from.

25. A system as recited in claim 24, wherein:
the file system manager sets the bitmask of the moved file or directory based on the bitmask of the directory to which the file or directory is being moved to.

26. A system as recited in claim 21, wherein:
the file system manager determines directories to be consulted and/or updated by looking up bitmask of the file or directory without traversing the file system.

27. A system as recited in claim 26, wherein:
the file system manager updates directory quotas of the directories represented by the bitmask of the directory to which a file or directory is being created, linked to, or moved to, to reflect storage to be occupied by the file or directory in the file system.

* * * * *